United States Patent [19]

Dion

[11] Patent Number: 4,878,554
[45] Date of Patent: Nov. 7, 1989

[54] MOTORIZED MAIL CART

[76] Inventor: Donald D. Dion, 270 Newport Ave., South Attleboro, Mass. 02703

[21] Appl. No.: 90,848

[22] Filed: Aug. 31, 1987

[51] Int. Cl.$^4$ ............................................. B62D 51/04
[52] U.S. Cl. .................................. 180/19.3; 180/65.1; 248/129; 280/62; D34/18
[58] Field of Search ..................... 180/19.1, 19.2, 19.3, 180/11, 13, 210, 280, 65.1; 248/129; 280/DIG. 5, 47.33, 47.35, 3, 62; D34/15, 17, 18

[56] References Cited

U.S. PATENT DOCUMENTS

| | | | |
|---|---|---|---|
| 2,673,671 | 3/1954 | Williams | 280/47.35 X |
| 2,924,287 | 2/1960 | Bramley | 180/19.3 X |
| 3,515,313 | 6/1970 | Siems | 180/19.3 X |
| 3,662,803 | 5/1972 | Kuvik | 280/47.35 X |
| 3,920,260 | 11/1975 | Downing | 280/47.35 X |

FOREIGN PATENT DOCUMENTS

| | | | |
|---|---|---|---|
| 26375 | 2/1984 | Japan | 180/19.3 |
| 802810 | 10/1958 | United Kingdom | 180/19.1 |

Primary Examiner—Mitchell J. Hill
Attorney, Agent, or Firm—Irving M. Kriegsman

[57] ABSTRACT

A motorized cart for the transportation of at least one mail bag includes a box-like frame having a plurality of hooks spaced along its top surface to which may be attached one or more mail bags. A pair of wheels are fixedly mounted to an axle disposed along the bottom surface of the frame. A third wheel is attached to the bottom surface of the frame to provide additional locomotive stability. To obviate manual transportation of the cart, the frame houses a motor which drives the rotation of the pair of wheels, a battery which supplies an initial electrical current to the motor, and a starter/generator which re-circulates electrical current to the motor. The revolution speed of the motor is controlled with a throttle actuated by twisting the handle mounted to the frame. A centrifugal clutch engages the motor and the axle once the motor attains a certain threshold revolution speed. A hand brake lever, disposed just below the handle and actuated by squeezing the hand brake lever towards the handle, is interconnected to a frictional assembly on the third wheel for the purpose of decreasing the vehicle's translocational velocity.

4 Claims, 2 Drawing Sheets

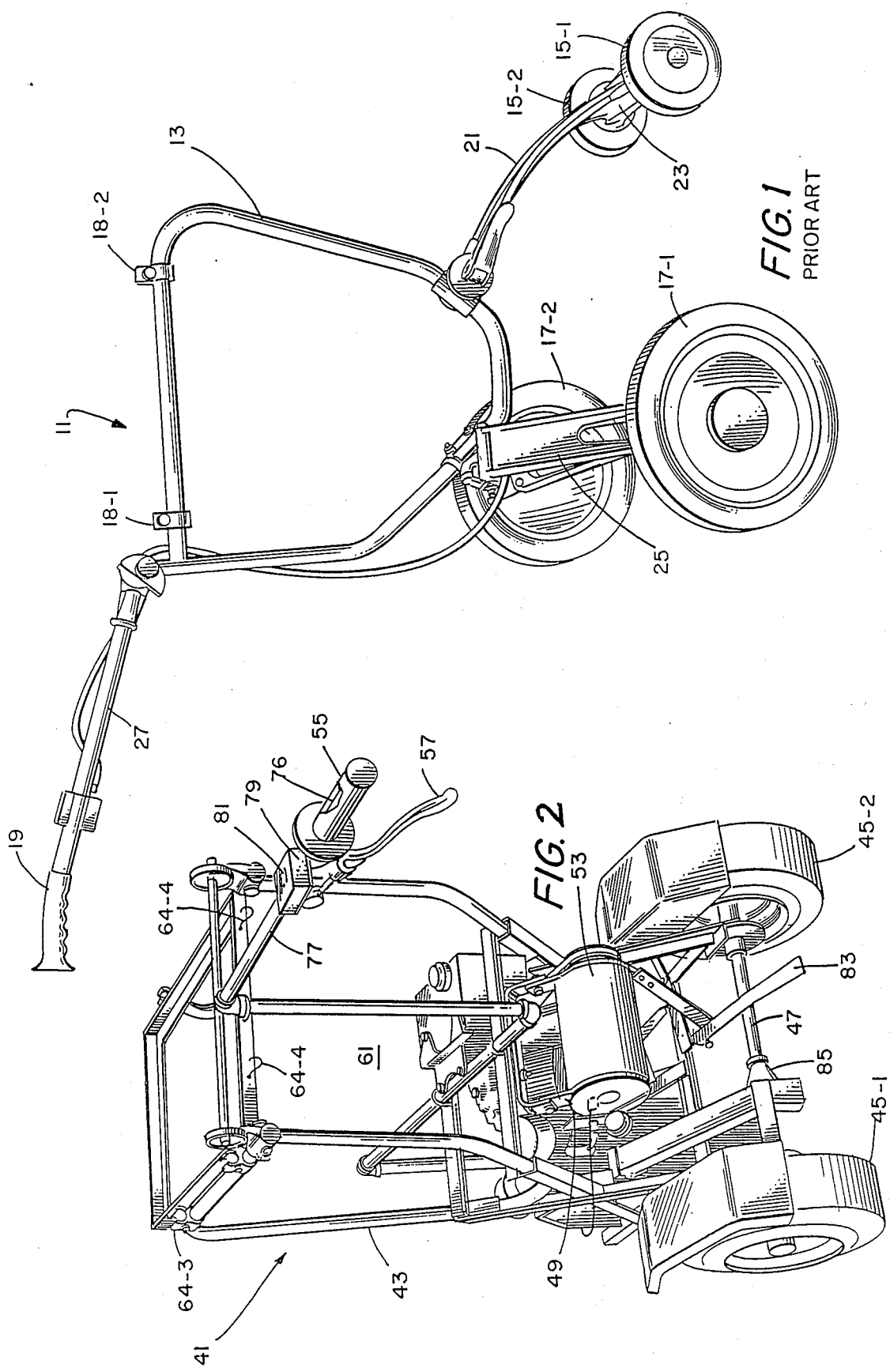

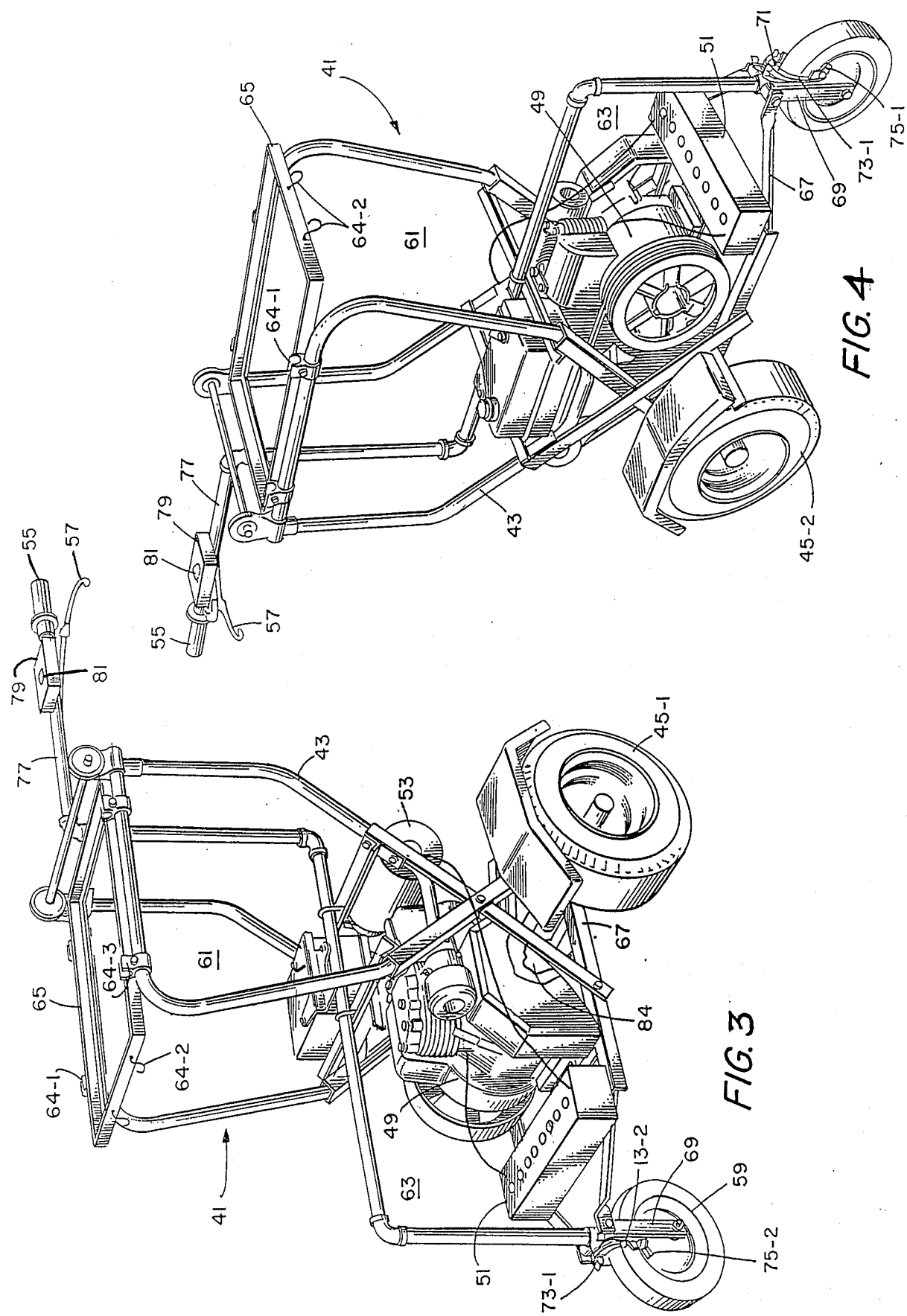

MOTORIZED MAIL CART

BACKGROUND OF THE INVENTION

This invention relates generally to carts and more specifically to a motorized cart for use by a mail carrier in delivering mail.

In the past, the United States Postal Service has employed jeeps, manual push carts, and shoulder pouches to aid a mail carrier in the delivery of mail. Mail routes that originate at the Post Office, often referred to as walking routes, normally do not employ jeeps. Typically, a mail carrier on a walking route will set out directly from the Post Office using either a manual push cart or a shoulder pouch to hold the mail which is to be delivered. Because routes are sized such that neither manual push carts nor shoulder pouches have the capacity to carry the mail for an entire route (a manual push cart is designed to carry two bags of mail totalling about 70 lbs. while a shoulder pouch is designed to carry about 35 lbs. of mail) and because it would be time consuming and cumbersome for a mail carrier to make frequent returns to the Post Office for the purpose of re-stocking the pouches or bags, most mail carriers arrange for installments of mail to be dropped off in sacks at predetermined relay points spaced along their routes. However, while this arrangement of relay points is preferable to multiple returns to the Post Office, an appreciable amount of time is expended at each relay point as the mail carrier transfers the mail from the mail sack left at the relay point to either the mail bag or the shoulder pouch, depending on which is being used.

Because a manual push cart can hold twice as much mail as a shoulder pouch, the employment of manual push carts significantly reduces the number of relay points that are needed. Unfortunately, manual push carts cannot be effectively or easily operated over snow covered terrain and consequently are not usually used in such situations. As a result, where shoulder pouches are the only viable means for transporting mail, either the number of relay points needed along the route must be increased or the route shortened. Another disadvantage to the use of shoulder pouches is the great deal of stress placed on the neck, back, and shoulder of the user, leading frequently to injury and occasionally to disability.

It is therefore abundantly clear that a great need exists for a mail cart which is easily maneuverable on all types of terrain, including snow covered terrain, and which is capable of transporting more mail that the presently employed manual push cart.

SUMMARY OF THE INVENTION

The present invention overcomes the problems encountered in the past and as set forth in detail hereinabove by providing a mail cart which is motorized so that it is capable of facile operation over any type of terrain, especiallly snow covered or hilly terrain and in addition has the capacity to transport more than two bags of mail at one time.

A mail cart constructed according to this invention includes a box-like frame, an axle rotably mounted on the frame, a pair of wheels fixed to the axle, a plurality of hooks mounted on the top of the frame to which may be attached a plurality of mail bags, a motor for rotating the axle, a clutch for selectively connecting the motor to the axle and a handle mounted on the frame for steering the cart.

It is therefore an object of this invention to provide a new and improved cart for use in transporting mail and the like.

It is another object of this invention to provide a new and improved mail cart which is motor driven so that it can be easily used on a variety of terrains, including snow covered terrain.

It is still another object of this invention to provide a new and improved mail cart which is capable of transporting more than two bags filled with mail at one time and which is capable of being operated by a letter carrier using only one hand.

It is a further object of this invention to provide a new and improved mail cart which makes it economically feasible to convert some types of Postal Service motor routes into walking routes.

Various features and objects will appear from the description to follow. In the description, reference is made to the accompanying drawings which form a part thereof, and in which is shown by way of illustrations, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which like reference numerals or characters represent like parts:

FIG. 1 is a perspective view of the prior art mail cart taken from the right side;

FIG. 2 is a perspective view partly broken away in section of one embodiment of a motorized mail cart constructed according to the teachings of the present invention taken from the back left;

FIG. 3 is a perspective view partly broken away in section of the motorized mail cart shown in FIG. 2 taken from the front right; and FIG. 4 is a perspective view of the motorized mail cart shown in FIG. 3 taken from the front left.

DETAILED DESCRIPTION OF PREFERRED EMBODIMENTS

The present invention is directed to a mail cart which is motorized for facile maneuvering over snow covered and rough terrain, which can be operated basically with one hand so that the other hand is free to hold mail and which has the capacity to transport more than two mail bags at one time. Several embodiments of the invention will hereinafter be described. In one embodiment, the mail cart includes a gas motor, a centrifugal clutch for automatically engaging the motor to a pair of wheels fixedly mounted to an axle once a threshold revolution speed is attained and a hand brake lever for operating a friction-based brake assembly attached to a third wheel of the cart. In another embodiment of the invention, the mail cart includes a motor and pulley system, the pulley system being capable of simultaneously disengaging a pair of spring-loaded brake shoes from a pair of wheels fixedly mounted on an axle and engaging the motor to the axle.

Referring now to the drawings and first to FIG. 1, there is illustrated a prior art mail cart for use in delivering mail generally designated by reference numeral 11.

Mail push carts 11 is manually driven (i.e. pushed by the user) and includes a belly frame 13, a front pair of wheels 15-1 and 15-2, a back pair of wheels 17-1 and 17-2, and a handle 19. Belly frame 13 is a unitary, tubular structure in the shape of a hoop. Affixed to the top of belly frame 13 is a pair of hooking devices 18-1 and 18-2. Belly frame 13 is connected to front pair of wheels 15-1 and 15-2 by means of a front leg 21. Front leg 21 is pivotally mounted at one end to belly frame 13. At its other end, front leg 21 forms an axle 23 about which front pair of wheels 15-1 and 15-2 are rotatably mounted. Belly frame 13 is hingedly connected to back pair of wheels 17-1 and 17-2 by means of a collapsable back axle 25 about which wheels 17-1 and 17-2 are rotatably mounted. Belly frame 13 is connected to handle 19 by means of an arm 27 one end of which is hingedly connected to belly frame 13 and the other end of which is inserted into handle 19.

To use push cart 11, a mail carrier attaches a mail bag (not shown) to each side of belly frame 13 by inserting hooking devices 18-1 and 18-2 into the corresponding holes (not shown) of said mail bags. The mail carrier then moves push cart 11 by grasping handle 19 and pushing forward (or pulling backward). To turn mail push cart 11, the mail carrier pushes downward on handle 19 until front pair of wheels 15-1 and 15-2 are lifted off the ground, pivots cart 11 on one of its back wheels, 17-1 or 17-2, depending on whether a right turn or a left turn is desired. To facilitate the storage of mail cart 11 after the completion of a day's deliveries, front leg 21 is pivoted up towards belly frame 13, collapsable back axle 25 is drawn in and up towards belly frame 13, and front arm 27 is pivoted down towards belly frame 13.

Referring now to FIGS. 2 through 4, there is illustrated a motorized mail cart constructed according to one embodiment of the present invention and designated generally be reference numeral 41. Motorized mail cart 41 includes a frame 43, a pair of wheels 45-1 and 45-2 fixedly mounted on an axle 47, a gas motor 49, a battery 51, a starter/generator 53, a fuel tank 54, a handle 55, a hand brake lever 57, and a third wheel 59.

Frame 43 includes a plurality of tubular and flat sections which together define a top portion 61 an intermediate portion 62 and a bottom portion 63. Top portion 61 is rectangular in shape and includes four pairs of hooks 64-1, 64-2, 64-3 and 64-4. A bag of mail (not shown) may be attached to each pair of hooks. For the transportation of additional loose mail, a permanent mail compartment (not shown) may be mounted on top portion 61 of frame 43. Moreover, a mail tray (not shown) may be hingedly mounted to top surface 65 to facilitate easy inspection of selected mail pieces. Motor 49, battery 51, fuel tank 54 and starter/generator 53, are fixedly mounted by any suitable means such as by bolts or by welding (not shown) on bottom portion 63. A third wheel 59 is rotably mounted on a third wheel assembly 69 which is pivotally attached to a frame section 67 on bottom portion 63. A friction-based brake assembly 71, which includes a pair of hingedly connected brake arms 73-1 and 73-2 and their corresponding brake pads 75-1 and 75-2 is mounted on lower portion 63. Hand brake lever 57 is connected to friction-based brake assembly 71 by means of a cable 76.

Handle 55 and hand brake lever 57 are connected to frame 43 by an arm 77. Handle 55 houses a throttle (not shown) that is actuated by twisting handle 55 (as in a motorcycle). An ignition box 79 into which a key (not shown) is inserted to start the motor is mounted on the top arm 77. Ignitition box 79 may also include an ammeter for displaying current. Motor 49 is connected to axle 47 by a centrifugal clutch 84.

An emergency foot brake lever 83 for selectively engaging axle 47 is disposed directly above axle 47 and connected to frame 43. A worm gear assembly 85 is connected to axle 47 to enable easy turning of cart 41.

To use motorized mail cart 41, bags containing mail are first hooked on to frame 43. A key is inserted into ignition box 79 and turned until motor 49 is started and emergency tool brake lever 83 is lifted off axle 47, motorized mail cart 41 is ready for forward motion. Handle 55 is then twisted to activate the throttle housed within. Once the motor 53 reaches a threshold revolution speed, centrifugal clutch 84 engages motor 49 with axle 47, thereby causing the rotation of pair of wheels 45-1 and 45-2. To slow down the transitional velocity of motorized mail cart 41, hand brake lever 57 is squeezed up towards handle 55. When hand brake lever 57 is pulled up, the cable connecting hand brake lever 57 to friction-based brake assembly 71 forces brake arms 73-1 and 73-2 to swing down and brake pads 75-1 and 75-2 to engage with third wheel 59. To turn motorized mail cart 41, downward force is applied to handle 55 until third wheel 59 is lifted off the ground. Once third wheel 59 is airborne, lateral force is applied to handle 55, thereby causing worm gear assembly 85 to engage with axle 47 and permitting pivotal movement on either of wheels 45-1 or 45-2.

In another embodiment of the invention, (not shown) emergency brake lever 83, third wheel brake assembly 71, and centrifugal clutch 84 are replaced with a pulley system which simultaneously engages motor 49 with axle 47 and disengages a pair of spring-loaded brake shoes (not shown) to pair of wheels 45-1 and 45-2 when hand brake lever 57 is pulled up towards handle 55.

It should be understood that the cart of this invention may be used to transport items other than mail.

These embodiments of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cart for transportation of bags of mail and the like comprising:
 a. a frame adapted to hold a plurality of mail bags and adapted to hold a compartment for additional storage of mail, the frame having a top portion and a bottom portion, the top portion having a top section which is rectangular in shape, the top portion being constructed to hold a mail tray and including four sets of spaced apart hooks each of to which may be attached a mail bag, the bottom portion having a bottom surface,
 b. an axle mounted on the frame for rotational movement,
 c. a pair of wheels fixedly mounted on the axle, d. a third wheel mounted on the bottom surface of the bottom portion to provide additional stability to the cart,
e. an internal combustion motor,
f. means for connecting the motor to the axle,
g. a battery for supplying an initial electrical current to the motor,
h. a starter/generator interconnecting the motor to the battery for relaying the initial electrical current from the battery to the motor, for re-circulating electrical current to the motor and for recharging the battery,
i. a handle mounted on the frame for steering the cart,
j. a throttle disposed within the handle and actuated by twisting said handle for varying the revolution speed of the motor, and
m. brake means for selectively slowing down movement of the cart, the brake means comprising a hand brake lever situated under the handle so that said hand brake lever and the handle can be grasped together with one hand in order to facilitate pulling said hand brake lever upward, a friction-based assembly situated on both sides of the third wheel, and a cable extending from the hand brake lever to the friction-based assembly which causes the friction-based assembly to engage with the third wheel when the hand brake lever is pulled upwards.

2. The invention of claim 1 and wherein said throttle comprises a gas-flow regulating mechanism.

3. The invention of claim 2 and wherein said means for interconnecting said motor to said axle comprises a centrifugal clutch connected to said motor and to said axle that engages said motor to said axle as soon as a threshold revolution speed is attained by said motor.

4. The invention of claim 3 and wherein an emergency foot brake lever, which prevents by the use of friction the rotation of said axle, is fixedly mounted on said frame.

* * * * *